United States Patent [19]

Horvath

[11] Patent Number: 5,007,605
[45] Date of Patent: Apr. 16, 1991

[54] HOSE AND CABLE SUPPORT

[75] Inventor: Daniel P. Horvath, Grande Prairie, Canada

[73] Assignee: Hosehandlers International Inc., Edmonton, Canada

[21] Appl. No.: 330,745

[22] Filed: Mar. 30, 1989

[51] Int. Cl.$^5$ .................................. F16L 3/00
[52] U.S. Cl. ........................... 248/62; 248/65; 248/75; 294/74
[58] Field of Search ............... 248/62, 58, 60, 61, 248/63, 65, 49, 51, 75, 903; 294/74, 151

[56] References Cited

U.S. PATENT DOCUMENTS

| 1,255,219 | 2/1918 | Pedersen | 248/60 |
| 1,873,477 | 8/1932 | Quarles | 248/61 X |
| 2,651,484 | 9/1953 | Marchetti | 248/61 |
| 3,000,433 | 9/1961 | Kemper | 248/62 X |
| 3,298,646 | 1/1967 | Van Buren, Jr. | 248/903 X |
| 3,941,412 | 3/1976 | Carpenter | 248/60 X |
| 4,004,768 | 1/1977 | Evans et al. | 248/60 X |
| 4,146,203 | 3/1979 | Williams | 248/62 |
| 4,744,535 | 5/1988 | Patenaude | 248/62 X |

FOREIGN PATENT DOCUMENTS

| 869848 | 2/1979 | Belgium . |
| 2810700 | 9/1979 | Fed. Rep. of Germany . |
| 57322 | 3/1980 | Finland . |
| 158661 | 11/1978 | Netherlands . |

OTHER PUBLICATIONS

Brochure of Carrying Industries.

*Primary Examiner*—Ramon O. Ramirez
*Attorney, Agent, or Firm*—Lawrence M. Nawrocki

[57] ABSTRACT

An apparatus for suspending hoses or cables which consists of an elongate support having a support surface in the shape of an arch with a vertex, depending haunches and intrados. A hose or cable may supported upon the vertex and haunches of the arch. At least one strap is secured transversely to the support. Loops or rings are provided for attaching the strap to a suspension line.

10 Claims, 5 Drawing Sheets

HOSE AND CABLE SUPPORT

The present invention relates to an apparatus for suspending hoses or cables.

BACKGROUND OF THE INVENTION

There are numerous industrial and commercial applications which require hoses or cables to be suspended from a support structure. At the present time a "sling" is used to suspend the hose or cable. The "sling" consists of a strap formed in a loop which extends transversely such that hose or cable rests on the strap. The force exerted by its own weight sometimes causes the hose or cable to become crimped over the strap. The stress exerted upon the material from such crimping ultimately leads to a failure of the cable or hose.

SUMMARY OF THE INVENTION

What is required is an apparatus for suspending hoses or cables which will prevent crimping.

According to the present invention there is provided an apparatus for suspending hoses or cables, which is comprised of an elongate support having a support surface in the shape of an arch with a vertex, depending haunches and intrados. A hose or cable may supported upon the vertex and haunches of the arch. At least one strap is secured transversely to the support. Means are provided for securing the strap to a suspension line.

This supporting configuration limits the extent to which the hose or cable will be bent to a controlled radius, selected with a view to minimizing the risk of damage due to crimping. The permissible radius of the arch varies with the diameter, weight and material of the hose or cable.

Although beneficial results may be obtained from using the described apparatus, the straps do a more effective job if they underlie the hose or cable. Even more beneficial results may therefore be obtained if the strap is secured to the intrados of the support.

Although beneficial results may be obtained from using the described apparatus, it is desirable that steps be taken to ensure that there is no slippage of the strap. Even more beneficial results may therefore be obtained if the support is made of a polymer plastic material and the strap is embedded in the support.

Although beneficial results may be obtained from using the described apparatus, there is a possibility that the hose or cable may shift laterally in the support during movement. Even more beneficial results may therefore be obtained if the support has side walls adjacent the support surface, such that the side walls form an interior channel which limits transverse movement of the hose or cable.

Although beneficial results may be obtained from using the described apparatus, if overloaded the arch shaped support structure may collapse. Even more beneficial results may therefore be obtained if the intrados is reinforced.

Although beneficial results may be obtained from using the described apparatus, the stress upon the strap is reduced if the support is balanced. Even more beneficial results may therefore be obtained if the support has a first end and a second end, and the strap is secured substantially equidistant between the first end and the second end of the support.

Although beneficial results may be obtained from using the described apparatus, some hoses and cables are so heavy that they cannot be readily loaded onto the support. Even more beneficial results may therefore be obtained if a single strap is used having a first portion which extends from one side of the support terminating in a first end and a second portion which extends from the opposed side of the support terminating in a second end, the second portion being longer than the first portion, the first end and second end being formed in a loop, such that when the second portion is placed under a hose or cable and then fed through the loop in the first portion a force exerted by a suspension line secured to the loop on the second portion will cause the second portion to pass through the loop in the first portion thereby drawing the support into a position where the support surface underlies the hose or cable.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
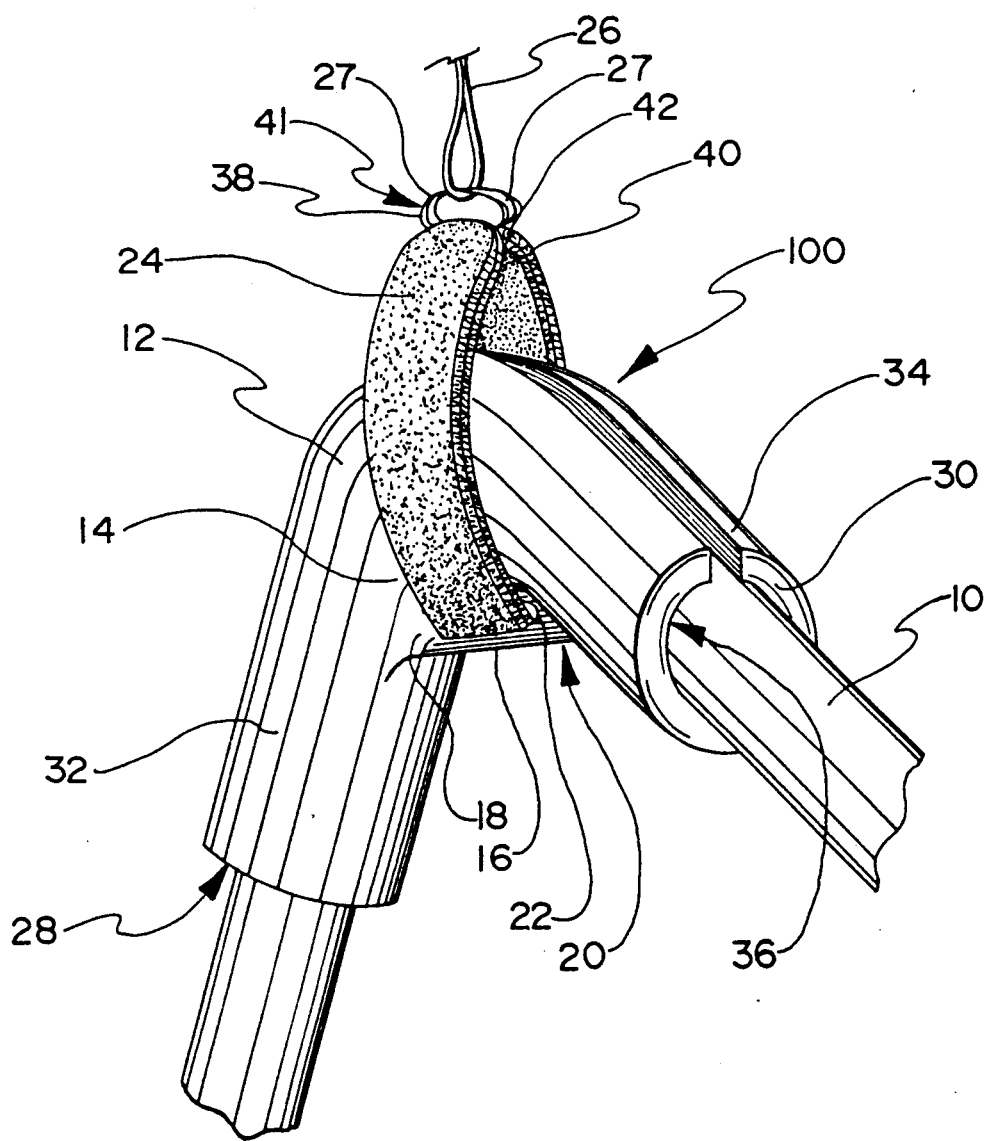
FIG. 1 is a perspective view of a first preferred embodiment of the invention.

The preferred embodiments will now be described with reference to FIGS. 1 through 5. The preferred embodiments are apparatus for suspending hoses or cables. Three embodiments are illustrated, a first embodiment generally designated by reference numeral 100, a second embodiment generally designated by reference numeral 200, and a third embodiment generally designated by reference numeral 300.

Each of the embodiments are variations on a basic structure. This basic structure consists of an elongate support 12 having a support surface 14 in the shape of an arch. The parts of arch shaped support surface 14 which are relevant to the description which follows are a vertex 16, depending haunches 18 and 20, and an intrados 22 (the inside curve of the arch). A hose or cable 10 may supported upon vertex 16 and haunches 18 and 20 of arch shaped support surface 14. A strap 24 is secured transversely to support 12 within intrados 22 of support surface 14. Strap 24 is intended to be attached to a suspension line 26.

The commercial production models of the basic structure have improvements added to increase their serviceability. Support 12 is made of a polymer plastic material, this enables strap 24 to be imbedded into support 12 thereby eliminating any possibility of strap 24 slipping or becoming detached. Intrados 22 is reinforced to ensure that the selected radius of arch shaped support 14 is maintained when a load is placed on support 12. Strap 24 is positioned substantially equidistant between the respective ends of support 12, which balances the load imposed by hose or cable 10 and thereby reduces the stress upon strap 24.

First embodiment 100, as illustrated in FIG. 1, consists of an elongate support 12 of a polymer plastic material having a support surface 14 in the shape of an arch. Arch shaped support surface 14 has a vertex 16, depending haunches 18 and 20. An intrados 22 underlying support surface 14 is reinforced. Support 12 has a first end 28 and a second end 30. Support 12 has side walls 32 and 34 positioned adjacent support surface 14 which form an interior channel 36. A strap 24 is embedded in intrados 22 substantially equidistant between first end 28 and second end 30 of support 12. Strap 24 has opposed ends 38 and 40 formed into loops 41 and 42 thereby permitting strap 24 to be attached to a suspension line 26.

In order to use first embodiment 100 a hose or cable 10 is manually positioned within interior channel 36 of support 12. When positioned within interior channel 36 hose or cable 10 is supported by vertex 16 and haunches 18 and 20 of support surface 14. Hose or cable 10 is prevented from transverse movement by side walls 32 and 34. Hose or cable 10 is prevented from movement longitudinally in interior channel 36 by friction. Strap 24 is then connected to a suspension line 26 by inserting hooks 27 secured to suspension line 26 through loops 41 and 42. As support 12 is raised by suspension line 26 the weight of hose or cable 10 is supported by support surface 14. The arch shape of support surface 14 prevents the crimping or bending of hose or cable 10.

Figure 2:
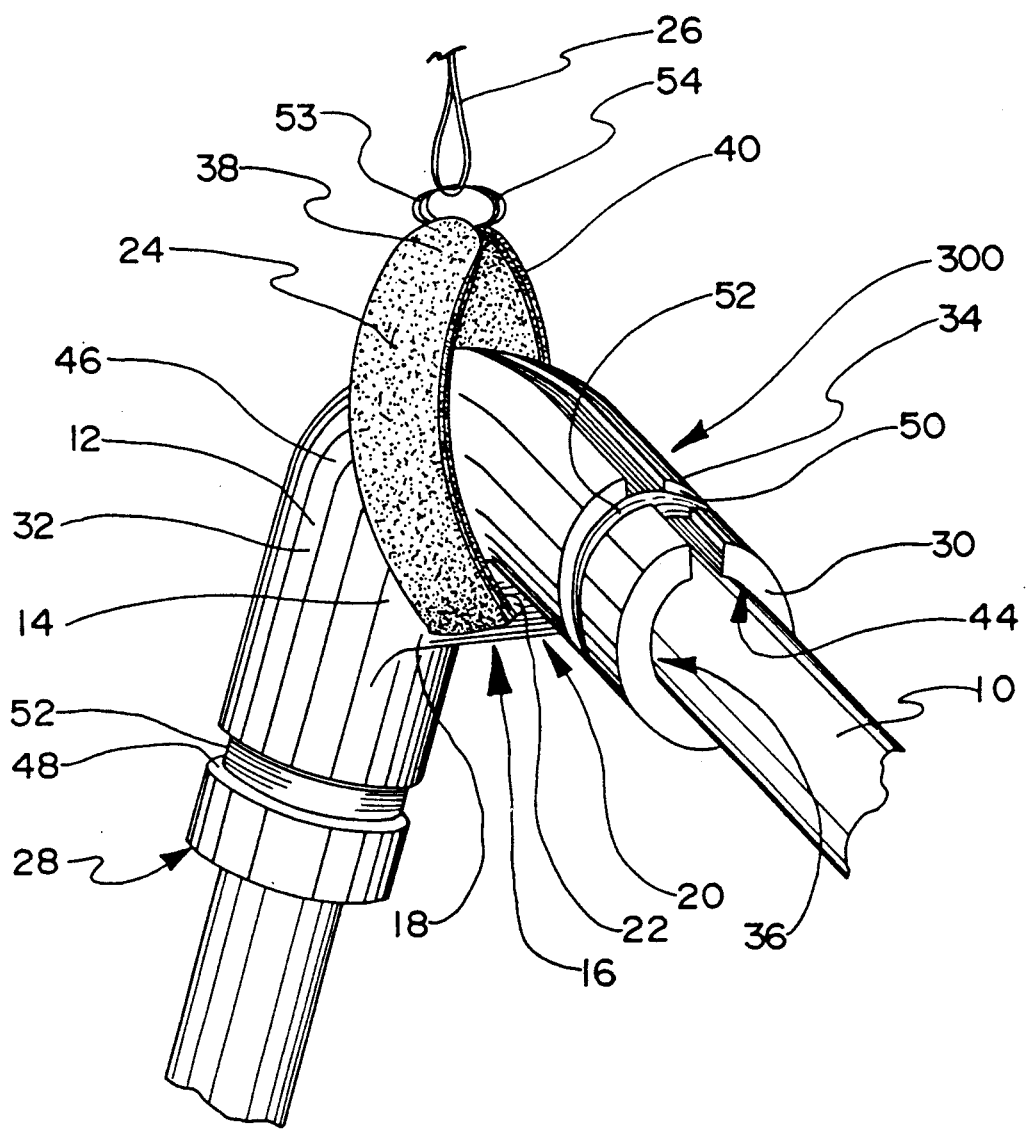
FIG. 2 is a perspective view of a second preferred embodiment of the invention.

Second embodiment 200, as illustrated in FIG. 2, consists of an elongate support 12 of a polymer plastic material having a support surface 14 in the shape of an arch. Arch shaped support surface 14 has a vertex 16 and depending haunches 18 and 20. Support 12 has a reinforced intrados 22 which underlies the arch of arch shaped support surface 14. Support 12 has a first end 28 and a second end 30. Support 12 has side walls 32 and 34 adjacent support surface 14 which form an interior channel 36. Interior channel 36 is circular in cross-section with a longitudinally extending slot 44 opposite support surface 14. Support 12 has an exterior surface 46 with transverse grooves 48 and 50 at each of ends 28 and 30. Clamping members 52 may be accommodated in transverse grooves 48 and 50 to secure hose or cable 10 within interior channel 36 of support 12. A strap 24 is embedded in intrados 22 substantially equidistant between first end 28 and second end 30 of support 12. Strap 24 has opposed ends 38 and 40 connected to rings 53 and 54 permitting strap 24 to be attached to a suspension line 26.

Second embodiment 200 is intended for use with hoses or cables 10 for which there is a danger of longitudinal movement along interior channel 36. In order to use second embodiment 200 a hose or cable 10 is manually positioned within interior channel 36 of support 12. When positioned within interior channel 36 hose or cable 10 is supported by vertex 16 and haunches 18 and 20 of support surface 14. Hose or cable 10 is prevented from transverse movement by side walls 32 and 34. Hose or cable 10 is prevented from movement longitudinally in interior channel 36 by clamping members 52 which are accommodated in transverse grooves 48 and 50. Strap 24 is then connected to a suspension line 26 by inserting hooks 27 secured to suspension line 26 through rings 53 and 54. As support 12 is raised by suspension line 26 the weight of hose or cable 10 is supported by support surface 14. The arch shape of support surface 14 prevents the crimping or bending of hose or cable 10.

Figure 3:
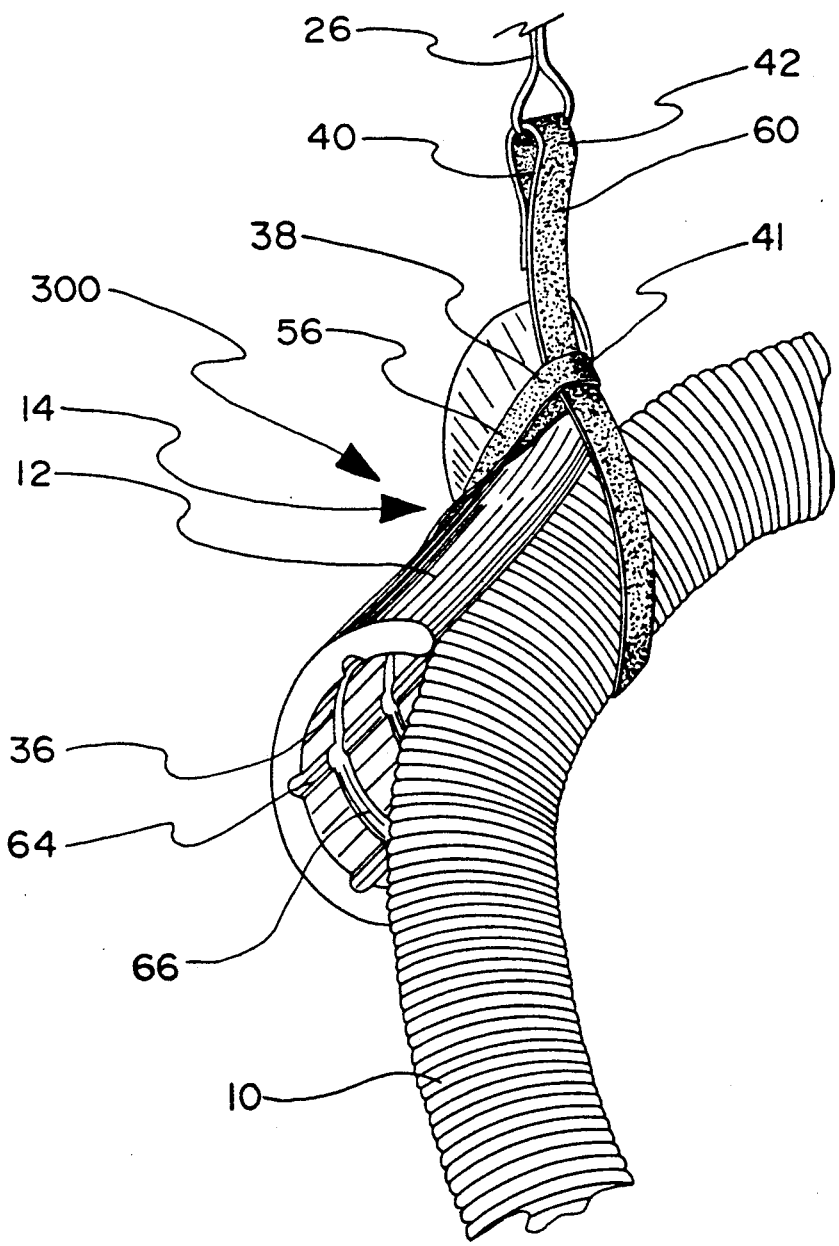
FIG. 3 is a perspective view of a third preferred embodiment of the invention in a first position.
Figure 4:
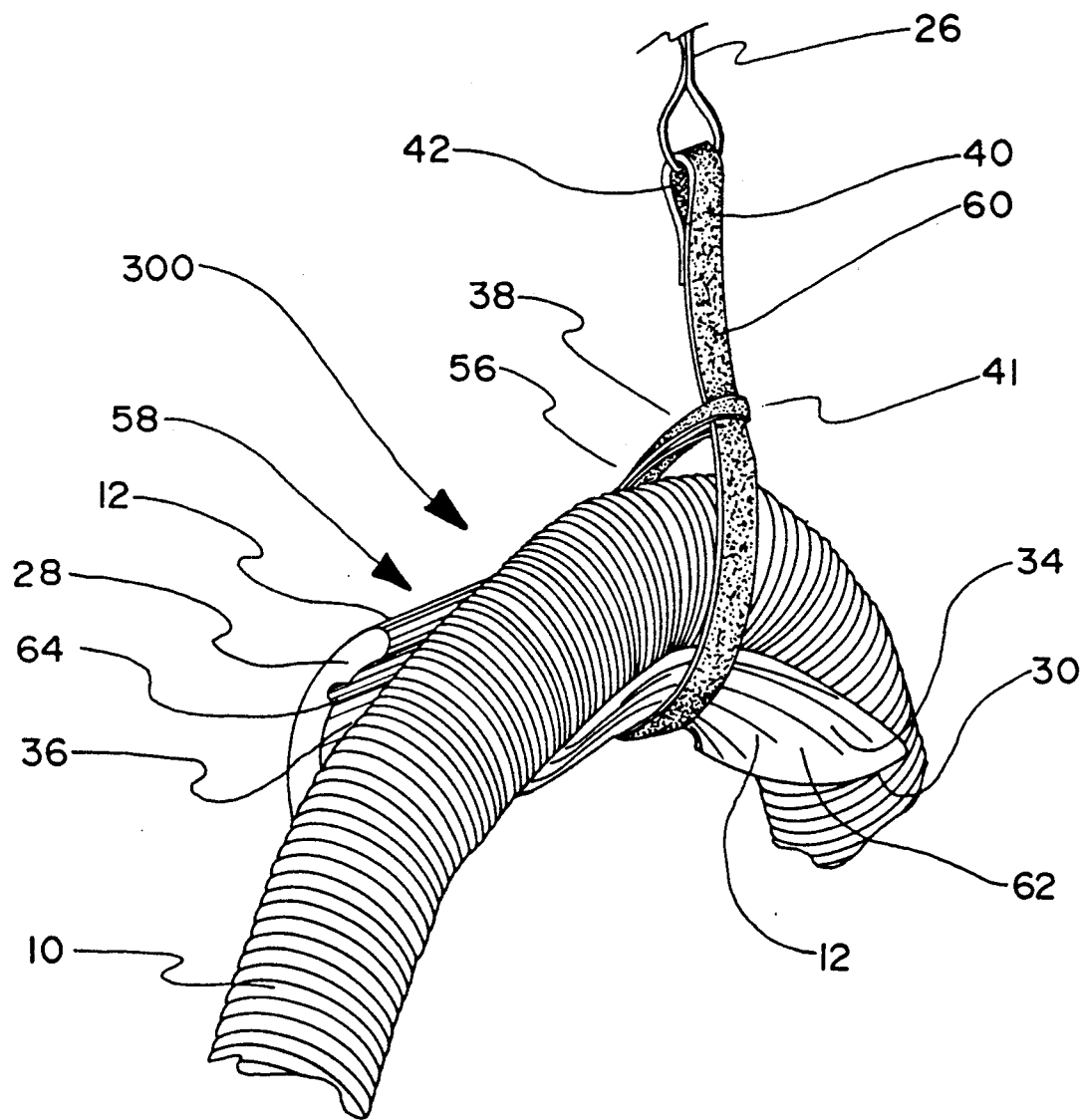
FIG. 4 is a perspective view of the third preferred embodiment of the invention in a second position.
Figure 5:
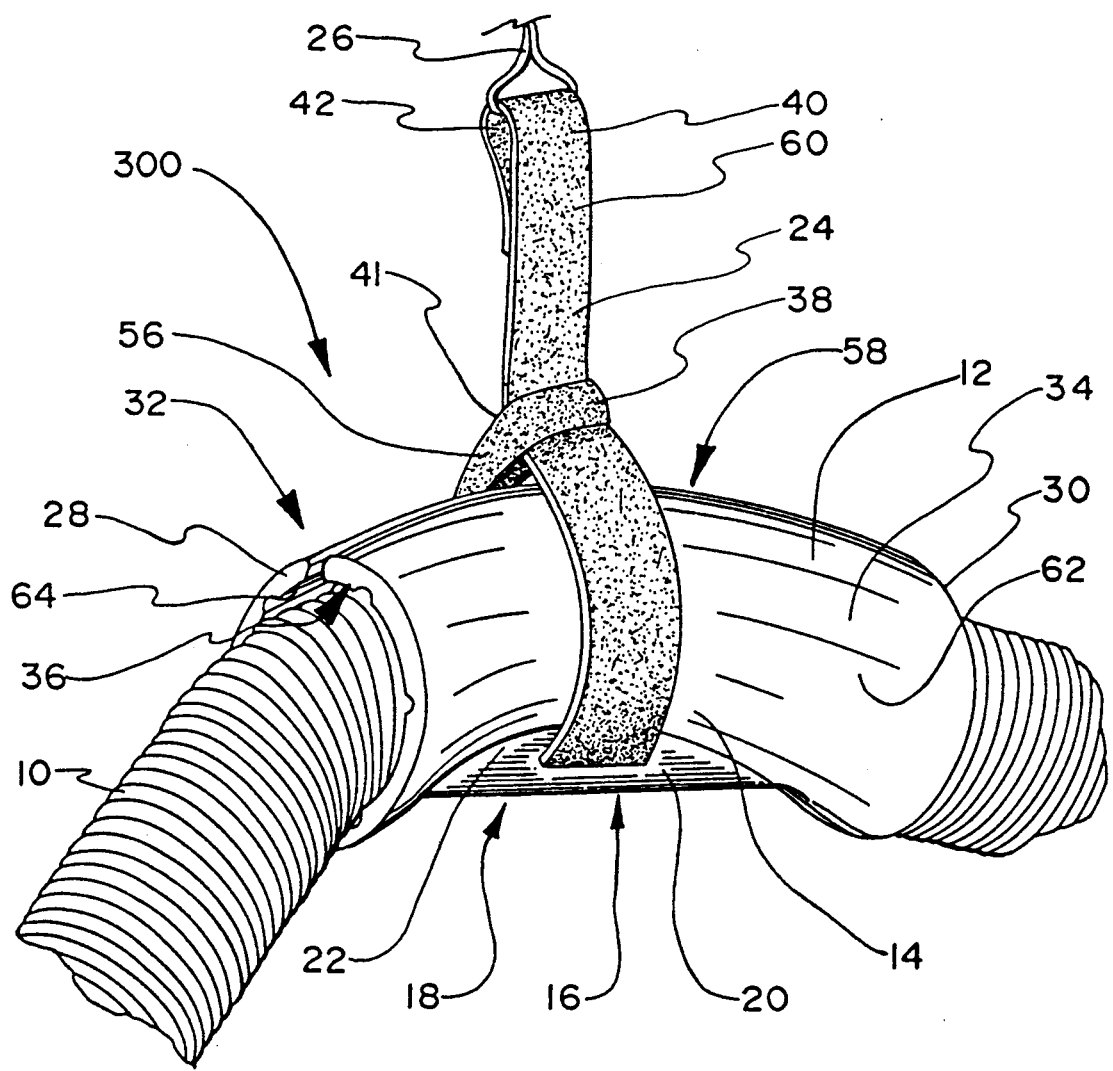
FIG. 5 is a perspective view of the third preferred embodiment of the invention in a third position.

Third embodiment 300, as illustrated in FIG. 3 through 5, consists of an elongate support 12 of a polymer plastic material having a support surface 14 in the shape of an arch. Arch shaped support surface 14 has a vertex 16, and depending haunches 18 and 20. Support 12 has a reinforced intrados 22 positioned under the arch of support surface 14. Support 12 has a first end 28 and a second end 30. Support 12 has side walls 32 and 34 adjacent support surface 14. A strap 24 is embedded in intrados 22 substantially equidistant between first end 28 and second end 30 of support 12. Strap 24 has a first portion 56 which extends from one side 58 of support 12 terminating in a first end 38. Strap 24 has a second portion 60 which extends from an opposed side 62 of support 12 terminating in a second end 40. Second portion 60 is longer than first portion 56. First end 38 and second end 40 of strap 24 are formed in loops, 41 and 42 respectively. Loops 41 and 42 are used when securing support 12 to a suspension line 26 as will be hereinafter explained. Interior channel 36 has a plurality of longitudinally extending drainage channels 64, and a plurality of raised transverse ribs 66.

Third embodiment 300 is intended for use in circumstances where hose or cable 10 is so heavy that it cannot be manually positioned within interior channel 36. The description of the use of third embodiment 300 will make reference to FIGS. 3 through 5 which are a series of illustrations of the manner in which third embodiment 300 loads hose or cable 10. Referring to FIG. 3, second portion 60 is placed under hose or cable 10 and then fed through loop 41 at first end 38 of first portion 56. Second portion 60 is then connected to suspension line 26 by inserting hooks 27 secured to suspension line 26 through loop 42 at second end 40 of second portion 60. Referring to FIG. 4, as a force is exerted by suspension line 26 second portion 60 is drawn through loop 41 at first end 38 of first portion 56. When second portion 60 is fully extended through loop 41, support 12 begins to rotate in relation to hose or cable 10. Referring to FIG. 5, support 12 rotates to a position wherein hose or cable 10 is positioned in interior channel 36 with support surface 14 underlying hose or cable 10. When positioned within interior channel 36 hose or cable 10 is supported by vertex 16 and haunches 18 and 20 of support surface 14. Hose or cable 10 is prevented from transverse movement by side walls 32 and 34. Hose or cable 10 is prevented from movement longitudinally in interior channel 36 raised transverse ribs 66. If one of embodiments 100, 200 or 300 is going to be attached to hose or cable 10 for a prolonged period of time, longitudinally extending drainage channels 64 provide a means to drain liquids and promote an air flow necessary to prevent the rotting of hose or cable 10.

It should be noted that for embodiment 300, the relative lengths of first portion 56 in relation to second portion 60 will vary with the circumference of hose or cable 10 which embodiment 300 is intended to handle. In each case, the lengths of first portion 56 and second portion 60 must be determined by trial and error.

It will be apparent to one skilled in the art that variations may be made which differ from the illustrated embodiments without departing from the spirit and scope of the invention. It will particularly be apparent to one skilled in the art that many of the preferred features may be omitted, without rendering unserviceable the arch shaped supporting surface. In particular, the applicant has experimented with increasing the numbers of straps and the positioning of the straps where the weight of the hose or cable is too great for a single strap.

The embodiments of the invention in which an exclusive property or privelege is claimed are defined as follows:

1. An apparatus for suspending hoses or cables, comprising:
   a. an elongate support of a polymer plastic material having a support surface in the shape of an arch with a vertex, depending haunches and intrados, such that a hose or cable may be supported upon the vertex and haunches of the arch, the support having a first end and a second end, the intrados being reinforced, such that the radius of the arch does not vary under the weight of the hose or cable, the support having side walls adjacent the support surface, such that the side walls form an interior channel which prevents transverse movement of the hose or cable; and
   b. a strap embedded in the intrados substantially equidistant between the first end and the second end of the support, the strap having a first portion which extends from one side of the support terminating in a first end and a second portion which extends from the opposed side of the support terminating in a second end, the second portion being longer than the first portion, the first end and second end of the strap being formed in loops, such that when the second portion is placed under a hose or cable and then fed through the loop in the first portion a force exerted by a suspension line secured to the loop on the second portion will cause the second portion to pass through the loop in the first portion thereby drawing the support into a position wherein the support surface underlies the hose or cable.

2. An apparatus for suspending hoses or cables comprising an elongate support having a support surface in the shape of an arch with a vertex, depending haunches and intrados, such that a hose or cable may be supported upon the vertex and haunches of the arch, at least one strap extending from the support generally transversely thereto, the strap having a first portion which extends from one side of the support terminating in a first end, and a second portion which extends from the opposed side of the support terminating in a second end, the second portion being longer than the first portion, the first end and second end being formed in respective loops, such that when the second portion is placed under a hose or cable and then fed through the loop in the first portion a force exerted by a suspension line secured to the loop on the second portion will cause the second portion to pass through the loop in the first portion thereby drawing the support into a position wherein the support surface underlies the hose or cable.

3. An apparatus for suspending hoses or cables, comprising, in combination:
   (a) an elongate arcuately shaped support:
   (b) said support having a first end portion and a second end portion and including an outside surface of the arcuately shaped support, said outside surface being a support surface portion of a concavely shaped cross-sectional configuraton complementary with the cross-section of a hose or cable to be suspended by the apparatus, said concavely shaped cross-sectional configuration being defined by a bottom wall section and two opposed side wall sections;
   (c) said support surface portion having the shape of an arch with a first haunch at said first end portion, a second haunch at said second end portion, and a vertex portion disposed between, and being integral with, said first and second haunches;
   (d) said support further having an integral intrados which forms an inside surface of the arcuately shaped support, said inside surface facing oppositely from said support surface portion;
   (e) the intrados including a web integral with said bottom wall section, said web extending from a point near said first end to a point near said second end and having an outermost surface portion spanning the arch thus gradually increasing the thickness of the bottom wall section in a direction from the respective haunch to the vertex portion, whereby the bottom wall section is at its maximum thickness at the vertex portion and its minimum thickness at each of said haunches;
   (f) suspension strap means for suspending the apparatus with a hose or cable supported therein, said suspension strap means being attached to said web at a point near said vertex portion, and extending about the side wall sections;
   whereby the web reinforces the intrados such that the radius of the arch generally does not vary under the weight of the hose or the cable when the support is suspended solely at said point near the vertex portion of the arch.

4. An apparatus as defined in claim 3, the strap means being secured to said web substantially equidistant between the first end portion and the second end of the support.

5. An apparatus as defined in claim 3, the support being made of a polymer plastic material and the strap means being embedded in the support.

6. An apparatus as defined in claim 4, the support having an exterior surface with a transverse groove formed in each of said first end portion and said second end portion such that a clamping member may be accommodated to secure a hose or cable within an interior channel of the support formed between said bottom wall section and said two opposed sidewall sections.

7. An apparatus as defined in claim 8, wherein said side wall sections have inner surface portions thereof provided with a plurality of transversely extending raised ribs.

8. An apparatus as defined in claim 3, wherein the sidewall sections have upper edge portions defining therebetween a slot opposite the support surface portion, whereby the hose or cable may be inserted into an interior channel bounded by said bottom wall section and said two opposed sidewall sections upon enlargement of the slot by spreading apart the sidewall sections.

9. An apparatus as defined in claim 3 wherein the support is made of molded polymer plastic material, and wherein the strap means is embedded in said web generally equidistant between the first end portion and the second end portion of the support, but freely overlaps outer surfaces of the side wall sections.

10. An apparatus for suspending hoses or cables, comprising:
   (a) an elongate, arcuately-shaped support having a first end and a second end, said support including an outer support surface for engaging the hose or cable to be suspended, and an inner, concave surface defining an intrados, said support including a first haunch defining said first end of said support and a second haunch defining said second end of said support;
   (b) a substantially rigid web extending inwardly from said intrados to reinforce said support and to maintain said first and second haunches at a defined angle relative to one another, said web having an aperture formed therethrough; and (c) strap means for suspending said support with a hose or cable supported therein, said strap means being adapted to pass through said aperture in said web.

* * * * *